US012705372B2

(12) United States Patent
Swaminathan et al.

(10) Patent No.: US 12,705,372 B2
(45) Date of Patent: Aug. 11, 2026

(54) CONTROLLING AN INTERACTION USING ONLINE ACCOUNT OPENING INDICATORS

(71) Applicant: Truist Bank, Charlotte, NC (US)

(72) Inventors: Sudhakar Swaminathan, Duluth, GA (US); Andrea Pennycooke, Smyrna, GA (US)

(73) Assignee: Truist Bank, Charlotte, NC (US)

( * ) Notice: Subject to any disclaimer, the term of this patent is extended or adjusted under 35 U.S.C. 154(b) by 464 days.

(21) Appl. No.: 18/347,172

(22) Filed: Jul. 5, 2023

(65) Prior Publication Data

US 2025/0013761 A1 Jan. 9, 2025

(51) Int. Cl.
*G06F 21/60* (2013.01)
*G06F 21/31* (2013.01)

(52) U.S. Cl.
CPC ............ *G06F 21/604* (2013.01); *G06F 21/31* (2013.01); *G06F 2221/2141* (2013.01)

(58) Field of Classification Search
CPC ......... G06F 21/31; G06F 21/64; G06F 21/604
See application file for complete search history.

(56) References Cited

U.S. PATENT DOCUMENTS 8,788,389 B1 * 7/2014 Fernandes .............. G06Q 20/40 705/42
10,496,990 B2 * 12/2019 Pourfallah ........... G06Q 20/425
11,328,356 B1 * 5/2022 Slowiak ................ H04L 9/0819
11,410,230 B1 * 8/2022 Olson ................. G06F 21/6245
2006/0101508 A1 * 5/2006 Taylor ...................... G07C 9/37 340/5.82
2006/0204051 A1 * 9/2006 Holland ................. G06Q 20/42 382/115
2007/0083463 A1 * 4/2007 Kraft ...................... G06Q 40/02 705/38

(Continued)

OTHER PUBLICATIONS

R. Bose, S. Chakraborty and S. Roy, "Explaining the Workings Principle of Cloud-based Multi-factor Authentication Architecture on Banking Sectors," 2019 Amity International Conference on Artificial Intelligence (AICAI), Dubai, United Arab Emirates, 2019, pp. 764-768. (Year: 2019).*

(Continued)

*Primary Examiner* — Kari L Schmidt
(74) *Attorney, Agent, or Firm* — Kilpatrick Townsend & Stockton LLP; Michael A. Springs, Esq.

(57) ABSTRACT

A system can be used to control an interaction using online indicators. The system can receive an interaction request associated with an electronic account type and that can be initiated via a computing device via a network communication. In response, the system may identify a request restriction of a security profile of the entity by executing an interaction processing service. The system can use the request restriction to identify an authorized online account opening indicator. In response to determining that the electronic account type is not consistent with the authorized online account opening indicator based on the request restriction, the system can challenge the interaction of the interaction request. In response to determining that the electronic account type of the interaction request is consistent with the authorized online account opening indicator based on the request restriction, the system can initiate the interaction of the interaction request.

20 Claims, 3 Drawing Sheets

(56) References Cited

U.S. PATENT DOCUMENTS

| | | | | |
|---|---|---|---|---|
| 2008/0208726 | A1* | 8/2008 | Tsantes | G06Q 40/00<br>705/35 |
| 2012/0123942 | A1* | 5/2012 | Song | G06Q 40/02<br>705/44 |
| 2015/0332392 | A1* | 11/2015 | Rose | G06Q 20/108<br>705/38 |
| 2016/0155196 | A1* | 6/2016 | Haller | G06Q 40/00<br>705/38 |
| 2019/0228173 | A1* | 7/2019 | Gupta | G06F 21/6245 |
| 2021/0058383 | A1* | 2/2021 | Colon | H04L 63/10 |
| 2021/0312451 | A1* | 10/2021 | Allbright | G06N 20/00 |
| 2024/0303640 | A1* | 9/2024 | Morse | G06Q 20/38215 |

OTHER PUBLICATIONS

G. L. Moepi and T. E. Mathonsi, “Multi-Factor Authentication Method for Online Banking Services in South Africa,” 2021 International Conference on Electrical, Computer and Energy Technologies (ICECET), Cape Town, South Africa, 2021, pp. 1-5. (Year: 2021).*

Maram, Deepak, Mahimna Kelkar, and Ittay Eyal. “Interactive multi-credential authentication.” Proceedings of the 2024 on ACM SIGSAC Conference on Computer and Communications Security. 2024, pp. 408-422. (Year: 2024).*

* cited by examiner

302
Receive an interaction request associated with an electronic account type, the interaction request being initiated via a computing device over a network 304
In response to receiving the interaction request, identify a request restriction associated with a security profile of the entity by executing an interaction processing service, the request restriction being usable to identify an authorized online account opening indicator 306
In response to determining that the electronic account type of the interaction request is not consistent with the authorized online account opening indicator based on the request restriction, challenge an interaction associated with the interaction request 308
In response to determining that the electronic account type of the interaction request is consistent with the authorized online account opening indicator based on the request restriction, initiate the interaction associated with the interaction request

*FIG. 3*

CONTROLLING AN INTERACTION USING ONLINE ACCOUNT OPENING INDICATORS

TECHNICAL FIELD

The present disclosure relates to authentication within computer systems and, more particularly (although not necessarily exclusively), to controlling an interaction using online account opening indicators.

BACKGROUND

Authentication can be a function of modern-day computer systems to secure confidential information in the computing systems. Due to the confidential nature of the information, a user may be authenticated before being granted access to confidential information. Authentication may involve determining the user is an owner of the information or is entitled to access the information. For example, and in certain instances, the service provider can allow the user to access the confidential information.

SUMMARY

In some examples, a system can control an interaction using an online account opening indicator. The system can include a processor and a memory including instructions that are executable by the processor for causing the processor to perform various operations. The system can receive an interaction request involving an electronic account type associated with an entity. The interaction request can be initiated over a network using a computing device. The system can, in response to receiving the interaction request, identify a request restriction associated with a security profile of the entity by executing an interaction processing service. The request restriction can be used to identify an authorized online account opening indicator of a plurality of online account opening indicators. The system can, in response to determining that the electronic account type of the interaction request is not consistent with the authorized online account opening indicator based on the request restriction, challenge an interaction associated with the interaction request. The system can, in response to determining that the electronic account type of the interaction request is consistent with the authorized online account opening indicator based on the request restriction, initiate the interaction associated with the interaction request.

In other examples, a method can be used to control an interaction using an online account opening indicator. An interaction request involving an electronic account type associated with an entity can be received. The interaction request can be initiated over a network using a computing device. In response to receiving the interaction request, a request restriction associated with a security profile of the entity can be identified by executing an interaction processing service. The request restriction can be used to identify an authorized online account opening indicator of a plurality of online account opening indicators. In response to determining that the electronic account type of the interaction request is not consistent with the authorized online account opening indicator based on the request restriction, an interaction associated with the interaction request can be challenged. In response to determining that the electronic account type of the interaction request is consistent with the authorized online account opening indicator based on the request restriction, the interaction associated with the interaction request can be initiated.

In yet other examples, a non-transitory computer-readable medium can include program code executable by a processing device for causing the processing device to perform various operations for controlling an interaction using online account opening indicators. The operations can include receiving an interaction request involving an electronic account type associated with an entity. The interaction request can be initiated over a network using a computing device. The operations can include, in response to receiving the interaction request, identifying a request restriction associated with a security profile of the entity by executing an interaction processing service. The request restriction can be used to identify an authorized online account opening indicator of a plurality of online account opening indicators. The operations can include, in response to determining that the electronic account type of the interaction request is not consistent with the authorized online account opening indicator based on the request restriction, challenging an interaction associated with the interaction request. The operations can include, in response to determining that the electronic account type of the interaction request is consistent with the authorized online account opening indicator based on the request restriction, initiating the interaction associated with the interaction request.

BRIEF DESCRIPTION OF THE DRAWINGS

FIG. 3 is a flowchart of a process for controlling an interaction using online indicators according to one example of the present disclosure.

DETAILED DESCRIPTION

Figure 1:
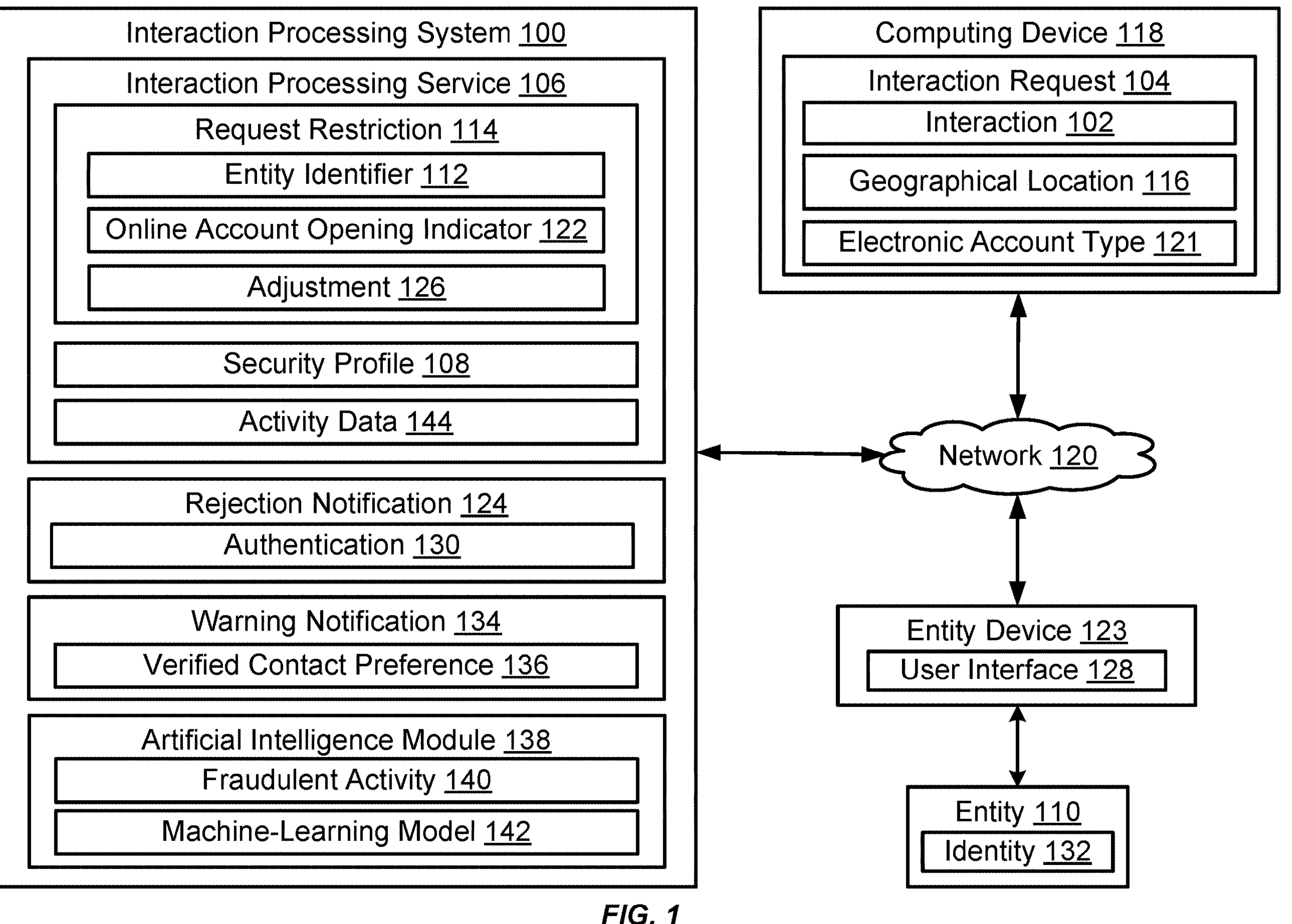
FIG. 1 is a block diagram of an example of an interaction processing system for controlling an interaction using online indicators according to one aspect of the present disclosure.

Certain aspects and features relate to controlling an interaction using online indicators to authenticate an interaction request associated with the interaction. The interaction can involve a transfer of data or resources between entities. For example, the interaction can include opening an electronic or online account for an entity to control resources such as online computing resources, etc. An interaction processing system can receive the interaction request that can be initiated by an entity, for example via a network communication or interaction. The interaction processing system can include an interaction processing service to authenticate the interaction request by determining whether the interaction request is authorized based at least on one or more online indicators. The interaction processing service can use the one or more online indicators that may indicate an authorized electronic or online account type, permission, or the like to determine whether the interaction request is authorized. For example, an online indicator may indicate that the type of electronic or online account associated with the interaction request is consistent with one or more authorized account types, etc. In some examples, the interaction processing service may identify the online account type of the interaction request using metadata included in the interaction request. Additionally or alternatively, the interaction processing system may tag the interaction request with a suitable location-based indicator to indicate a geographical location once the interaction processing system receives the interaction request. If the interaction request is authorized, the interaction processing system can initiate the interaction associated with the interaction request. In some examples, if the interaction request is determined to be unauthorized or suspect, the interaction processing system may challenge or deny the interaction associated with the interaction request.

The interaction processing service of the interaction processing system can use the online indicator to generate a request restriction to determine an authorization indicated by the entity with respect to one or more electronic account types, electronic account permissions, and the like. For example, the request restriction may be a rule set that can include one or more instructions used to determine allowability of the interaction requests. The interaction processing service can access a security profile of the entity to determine whether a request restriction that restricts interaction requests with respect to the electronic account is present in the security profile of the entity. In some examples, the security profile can group a set of request restrictions based on the set of request restrictions being associated with the entity. The interaction processing system can include a unique entity identifier for each entity to identify a respective security profile. Once the interaction processing system identifies the security profile of the entity, the interaction processing system can query the set of request restrictions in the security profile to identify a suitable request restriction to apply to the interaction request. In some examples, the set of request restrictions may not be applicable to the interaction request in that the interaction processing system can proceed with initiating the interaction of the interaction request.

If the interaction processing service identifies a request restriction of the security profile that may restrict authorization with respect to the electronic account, the interaction processing system may challenge the interaction of the interaction request. In some examples, the interaction processing system may outright deny the interaction or interaction request after challenging the interaction. In other examples, the interaction processing system may request additional verification from the entity, or perform additional authentication techniques, to verify an identity of the entity, a validity of the request to generate the electronic account, or a combination thereof. If the interaction processing system can verify the identity of the entity, the validity of the request, or a combination thereof, the interaction processing system may initiate the interaction. In some examples, if the interaction processing system is unable to verify the identity of the entity, the validity of the request, or a combination thereof, the interaction processing system may challenge or reject the interaction or interaction request.

Using the request restriction to restrict authorization of the interaction request can prevent an unauthorized interaction from being initiated by the interaction processing system. Additionally, restricting authorization of the interaction request can improve information security by preventing unauthorized access to protected resources. In some examples, a malicious actor may use a computing system to fraudulently generate an interaction request using sensitive data corresponding to the entity. For example, the malicious actor can use the sensitive data to impersonate the entity at a physical location or through communication channels, such as an interactive voice response system. The malicious actor may gather the sensitive data over time, for example by intercepting personal information shared on unsecured networks, using social engineering, or a combination thereof. For example, if the malicious actor uses social engineering to obtain the sensitive data, the malicious actor may implement pretexting to obtain personal information from the entity or from a service provider protecting the sensitive data. Examples of the sensitive data can include names, address, email addresses, login identifiers, geolocation information, driver's license numbers, biometric information, or other personally identifiable information.

Due to security concerns of the malicious actor fraudulently generating the interaction request, the interaction processing system can use the request restriction indicated by the entity to authenticate interaction requests with respect to a respective electronic account type of the interaction request. In some examples, the interaction processing system may challenge an interaction request initiated by the entity based on the request restriction indicated by the entity. In such examples, the entity may have used the request restriction to indicate a lack of authorization for certain types of electronic accounts or certain types of techniques for generating the electronic account and may have forgotten to adjust the request restriction prior to initiating the interaction request.

The interaction processing system can address the above-described and other vulnerabilities by restricting access to protected resources using the request restriction. Additionally, the interaction processing system can dynamically apply adjustments to the request restriction from the entity to enable personalized security protections. In some examples, the interaction processing system may alert the entity in response to challenging an interaction request to allow the entity to adjust the request restriction to allow the challenged interaction request, if desired or authorized. For example, if the request restriction was initiated by the entity, but the request restriction was mistakenly left enabled, the entity can adjust the request restriction to allow the interaction request. Once the request restriction is adjusted, the interaction processing system can detect the adjustment and can initiate the interaction indicated by the interaction request.

These illustrative examples are given to introduce the reader to the general subject matter discussed here and are not intended to limit the scope of the disclosed concepts. In the following description, for the purposes of explanation, specific details are set forth in order to provide a thorough understanding of various implementations and examples. Various implementations may be practiced without these specific details. The figures and description are not intended to be restrictive.

FIG. 1 is a block diagram of an example of an interaction processing system 100 for controlling an interaction 102 using online indicators to authenticate an interaction request 104 associated with the interaction 102 according to one aspect of the present disclosure. Examples of the interaction 102 can include retrieving requested resources, such as data from a database, or performing a requested function such as generating or otherwise opening an electronic account on behalf of an entity. The interaction processing system 100 can, for example, be or include a computing system that can facilitate processing interaction requests and can improve data security by monitoring the interaction requests for unauthorized interaction requests. The interaction requests processed by the interaction processing system 100 can be associated with one or more entities, such as users, organizations, devices, and the like.

The interaction processing system 100 can include an interaction processing service 106 that can determine whether the interaction request 104 is authorized or allowable. The interaction processing service 106 can access a security profile 108 associated with an entity 110 to determine authorization of the interaction request 104. For example, the interaction processing service 106 may determine the security profile 108 of the entity 110 using an entity identifier 112 associated with the entity 110. In some examples, the security profile 108 can include a request restriction 114 that can indicate the authorization associated with the interaction request 104, for example with respect to the online indicators. The request restriction 114 can be implemented as a rule set, a decision table, a control table, a decision tree, via other implementations, or any combination thereof. For example, the request restriction 114 may restrict the authorization of the interaction request 104 based on a type of electronic account, such as the electronic account type 121, requested to be generated via the interaction request 104, based on the interaction request 104 involving an electronic account, etc. Additionally or alternatively, the request restriction 114 may restrict the authorization of the interaction request 104 based on a location from which the interaction request 104 was generated or based on a location from which the interaction request 104 was transmitted, etc. In some examples, the security profile 108 may include more than one request restriction 114 such as a respective request restriction for each type of electronic account, for each access point, and the like that a malicious actor may exploit to access protected resources associated with the entity 110. For example, an access point may correspond to a communication channel such that a respective request restriction may be associated with restricting the interaction request 104 with respect to an originating source of the interaction request 104. Additionally or alternatively, types of electronic accounts can include a resource deposit account, a resource investment account, a retirement account, and the like.

The interaction processing system 100 can receive the interaction request 104 that can be initiated by the entity 110 approximately at a geographical location 116, for example using a computing device 118 positioned approximately at the geographical location 116. Examples of the computing device 118 can include a mobile computing device, a personal computing device, a tablet computing device, an automated teller machine (ATM), etc. In some examples, the geographical location 116 of the computing device 118 can include a request center that can facilitate generating the interaction request 104 or initiating the interaction 102.

The computing device 118 can be communicatively coupled with the interaction processing system 100 via a network 120. The network 120 can include any type of network that can support data communications using any of a variety of commercially-available protocols. In some examples, examples of the network 120 can include, without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. In some examples, the network 120 connecting the computing device 118 and the interaction processing system 100 may be or include a local area network (LAN), such as one based on Ethernet, Token-Ring or the like. The network 120 also may be or include a wide-area network, such as the Internet, or may include financial networks or banking networks, telecommunication networks such as a public switched telephone networks (PSTNs), cellular or other wireless networks, satellite networks, television/cable networks, or virtual networks such as an intranet or an extranet, etc. Infrared and wireless networks, such as those using the Institute of Electrical and Electronics (IEEE) 802.11 protocol suite or other wireless protocols, may also be included in the communication networks.

In some examples, the computing device 118 can generate the interaction request 104 using input associated with the entity 110, such as from the computing device 118, for example through the network 120. The entity 110 can interact with the computing device 118, for example using a graphical user interface output by the computing device 118 to receive input from the entity 110. For example, the computing device 118 may receive input from the entity 110 in response to providing prompts to the entity 110 via the graphical user interface. Examples of the input can include verbal input, textual input, numerical input, touchscreen input, or a combination thereof. The prompts output by the computing device 118 can include auditory or visual prompts to direct the entity 110 to provide the input to the computing device 118. Once the computing device 118 receives the input, the computing device 118 then can generate the interaction request 104 based on the input. In some examples, the input that can be used to generate the interaction request 104 can include indications that the entity 110 is attempting to open an electronic account or to otherwise cause the electronic account to be generated. The electronic account can be or include one or more types of electronic accounts such as a resource deposit or investment account, an online security account, and the like, though other suitable types of electronic accounts are possible.

Once the interaction processing system 100 receives the interaction request 104, the interaction processing system 100 can perform one or more actions based on the authorization of the interaction request 104. The interaction processing system 100 can use the interaction processing service 106 to determine the authorization of the interaction request 104, for example based on the request restriction 114 of the security profile 108. In some examples, the request restriction 114 may specify an authorized online account opening indicator 122 (or an authorized online account generation indicator, etc.) with respect to the interaction request 104 that can render the interaction request 104 unauthorized or authorized. The request restriction 114 can specify the authorized online account opening indicator 122 as a type of electronic account, an authentication technique used for requesting to generate the electronic account, etc.

The request restriction 114 may include one or more certain account types, authentication techniques, etc. to designate the online account opening indicator 122 as authorized. For example, the authorized online account opening indicator 122 can include at least one type of electronic account indicated as acceptable for opening via network communications or another online account identifier. In some examples, the authorized online account opening indicator may be empty or nil such that the request restriction 114 may be configured to prevent generating any type of electronic account via a computing device or via a network communication. Additionally or alternatively, the request restriction 114 may indicate an authorization technique associated with a level of access for authorizing the interaction request 104 for one or more certain types of electronic accounts. For example, the request restriction 114 can include a first indication that a username/password combination can be used to open a first type of electronic account or to otherwise cause the first type of electronic account to be generated, and the request restriction 114 can include a second indication that at least biometric authentication is required to be used to open a second type of electronic account or to otherwise cause the second type of electronic account to be generated.

In some examples, the request restriction 114 may indicate an authorized online account opening indicator 122. Alternatively, the request restriction 114 can indicate more than one authorized online account opening indicators 122. In some examples, the authorization of the interaction 102 may vary based on a type of the interaction 102 such that the authorized online account opening indicator 122 may be different for different types of the interaction 102. In implementations of banking or financial services systems, a deposit account generation can be a type of the interaction 102 allowable with a certain authentication technique, whereas an investment account or retirement account may be another type of the interaction 102 allowable with different authentication techniques. Additionally or alternatively, the different types of electronic accounts can be authorized or rejected based on geographical location, branch location, or the like in addition to the online account opening indicator 122.

The electronic account type 121, the interaction 102 associated with the interaction request 104, or a combination thereof can be compared to the authorized online account opening indicator 122 to determine whether the interaction request 104 can be authorized. In some examples, restricting the authorization of the interaction request 104 to the authorized online account opening indicators 122 can improve protection of the protected resources. For example, using the request restriction 114 to restrict the authorization of the interaction request 104 can prevent the protected resources from being accessed due to an interaction request 104 initiated by a malicious actor via a network communication that the entity 110 indicates is restricted. In implementations of banking or financial services systems, the request restriction 114 can prevent fraudulent loans or accounts from being generated with respect to the authorized online account opening indicators 122, thereby improving fraud prevention.

If the interaction processing service 106 determines that the interaction 102 of the interaction request 104 is authorized, the interaction processing system 100 can initiate the interaction 102 to fulfill the interaction request 104. For example, if interaction 102 of the interaction request 104 involves the electronic account type 121, the interaction processing system 100 can initiate the interaction 102 by generating the electronic account type 121 requested by the entity 110. In some examples, the interaction processing system 100 may transmit an approval message to the entity 110 or an entity device 123 associated with the entity 110 to indicate that the interaction 102 has been initiated.

In some examples, if the interaction processing service 106 determines that the interaction 102 of the interaction request 104 is unauthorized or may be unauthorized, the interaction processing system 100 can transmit a rejection notification 124 to the entity device 123 to indicate this result. In response to the interaction processing system 100 transmitting the rejection notification 124 indicating that the interaction request 104 is unauthorized, the entity 110 may use the entity device 123 to adjust the request restriction 114. Adjusting the request restriction 114 can occur prior to or subsequent to initiating the interaction request 104 such that the entity 110 can control the authorization of the interaction request 104. In some examples, the entity device 123 may adjust the request restriction 114, for example subsequent to the entity 110 receiving the rejection notification 124, due to the request restriction 114 being mistakenly left as active. For example, the entity 110 may initiate an interaction request 104 involving the electronic account type 121 using a computing device 118 and a network communication. The entity 110 may have forgotten that the request restriction 114 for the electronic account type 121 was active, and the request restriction 114 can be adjusted to reflect the intentions of the entity 110. Thus, the interaction processing system 100 can detect an adjustment 126 to the request restriction 114 initiated by the entity 110 to enable the interaction 102 to be authorized.

In some examples, the adjustment 126 to the request restriction 114 can be indicated by the entity 110 using a user interface 128 of the entity device 123 to access the security profile 108 of the entity 110, for example through a webpage or mobile application. In a particular example, the user interface 128 can include a toggle switch that can enable the entity 110 to adjust the request restriction 114 by interacting with the toggle button. Other examples of interactive elements in the user interface 128 can include dropdown menus, text boxes (e.g., natural language input fields), radio buttons, checkboxes, or a combination thereof. Similar to adjusting the request restriction 114, the interaction processing system 100 may generate a request restriction 114 based on input received from the entity device 123, for example input by the entity 110 using the user interface 128 of the entity device 123. Once the interaction processing system 100 detects the adjustment 126 to the request restriction 114, the interaction processing service 106 can repeat one or more of the above-described techniques to determine whether the interaction request 104 is authorized based on the adjusted request restriction. If the interaction request 104 is determined to be authorized based on the adjusted request restriction, the interaction processing system 100 can initiate the interaction 102 associated with the interaction request 104.

Additionally or alternatively, the interaction processing system 100 may use the rejection notification 124 to challenge the interaction 102, for example instead of outright denying the interaction 102. In some examples, the interaction processing system 100 can use the rejection notification 124 to request an authentication 130, such as an enhanced or more scrutinized authentication, from the entity 110, for example to verify an identity 132 of the entity 110 or a validity of the interaction request 104. For example, the interaction processing system 100 may request that the entity 110 provide multifactor authentication (MFA) as the authentication 130 to verify the identity 132 of the entity 110. Providing the MFA can involve inputting one or more authentication factors. Examples of the authentication factors can include a username, password, biometric marker, personal identification number (PIN), authentication code, one-time password authentication, or any combination thereof. In some examples, the entity device 123 may include an authenticator application installed on the entity device 123 to provide the MFA as the authentication 130 to the interaction processing system 100.

If the interaction processing system 100 can verify the identity 132 of the entity 110, or the validity of the interaction request 104, using the authentication 130, the interaction processing system 100 may initiate the interaction 102 associated with the interaction request 104. Otherwise, the interaction processing system 100 may deny the interaction request 104 to prevent the interaction 102 from being initiated. When the interaction processing system 100 denies the interaction request 104, the interaction processing system 100 may transmit a warning notification 134 to the entity device 123 to alert the entity 110 indicating that the interaction request 104 may be unauthorized. In some examples, the interaction processing system 100 may transmit the warning notification 134 based on a verified contact preference 136 indicated by the entity 110. For example, the verified contact preference 136 can indicate that the entity 110 may prefer communication via email, phone call, or text messaging. Additionally, the verified contact preference 136 can indicate a specific email address or phone number to use to transmit the warning notification 134 to the entity 110. Transmitting the warning notification 134 based on the verified contact preference 136 may improve a likelihood of the entity 110 receiving the warning notification 134 such that the entity 110 can address the interaction request 104 that may be unauthorized.

In some examples, the interaction processing system 100 may execute an artificial intelligence (AI) module 138 to identify fraudulent activity 140 based on the interaction 102 being unauthorized. In some examples, the AI module 138 can be trained or otherwise configured to identify the fraudulent activity 140 using a machine-learning model 142 that can analyze activity data 144 from the interaction processing service 106. In some examples, more than one machine-learning model, or other suitable type of AI model or module, may be used to analyze the activity data 144. In some examples, the AI module 138 can classify input data among two or more classes; cluster input data among two or more groups; predict a result based on input data; identify patterns or trends in input data; identify a distribution of input data in a space; or any combination of these. Examples of machine-learning models that can be included in the AI module 138 can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusters, such as k-means clusters, mean-shift clusters, and spectral clusters; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination thereof.

In some examples, the AI module 138 can be configured through an at least partially automated (e.g., with little or no human involvement) process such as training. During training, training data can be iteratively supplied to the machine-learning model 142 to enable the machine-learning model 142 to identify patterns related to the training data or to identify relationships between the training data and output data. For example, the machine-learning model 142 can be trained to identify whether the interaction 102 or the interaction request 104 fits typical entity behavior based on the training data. In some examples, the training data can be acquired by the interaction processing service 106, constructed from various subsets of data, or input by a trainer. The various subsets of data can include data from one or more previous interactions, theoretical data for a future interaction, or a combination of these. As more interaction requests are received over time, the training data can be updated for further tuning the machine-learning model 142.

After analyzing the activity data 144 using the machine-learning model 142, the interaction processing system 100 can determine whether the interaction 102 is fraudulent. In a particular example, the machine-learning model 142 may use the training data to determine that the entity 110 typically requests electronic accounts in-person or via a network communication. The machine-learning model 142 then may flag any interaction request initiated inconsistent with the typical behavior indicated by an output of the machine-learning model 142. For example, the machine-learning model 142 may output a confidence score to represent a likelihood of the interaction 102 or the interaction request 104 being fraudulent. Examples of the confidence score can include a percentage, decimal, integer, or other suitable quantitative measurements. In such examples, the confidence score may range from 0% to 100% with 0% representing a zero or negligible likelihood of the interaction 102 being fraudulent. When the confidence score is above a predetermined threshold, such as 50%, 55%, 60%, 65%, 70%, 75%, or the like, the interaction processing system 100 can transmit the warning notification 134 to alert the entity 110 regarding the fraudulent activity 140 associated with the interaction request 104. As described above, the interaction processing system 100 can use the verified contact preference 136 indicated by the entity 110 to transmit the warning notification 134 to the entity 110. The interaction processing system 100 may set the predetermined threshold based on input from an administrator or developer. Additionally or alternatively, the interaction processing system 100 may identify a sensitivity indicated by the entity 110 with respect to being alerted about the fraudulent activity 140. Based on this sensitivity, the interaction processing system 100 can determine a suitable threshold associated with the confidence score.

Although FIG. 1 illustrates a particular number and arrangement of components, FIG. 1 is intended to be illustrative and non-limiting. Other examples may include more components, fewer components, different components, or a different arrangement of the components shown in FIG. 1. For instance, the activity data 144 may be stored external to the interaction processing service 106, such as in the AI module 138. Any suitable arrangement of the depicted components is contemplated herein.

Figure 2:
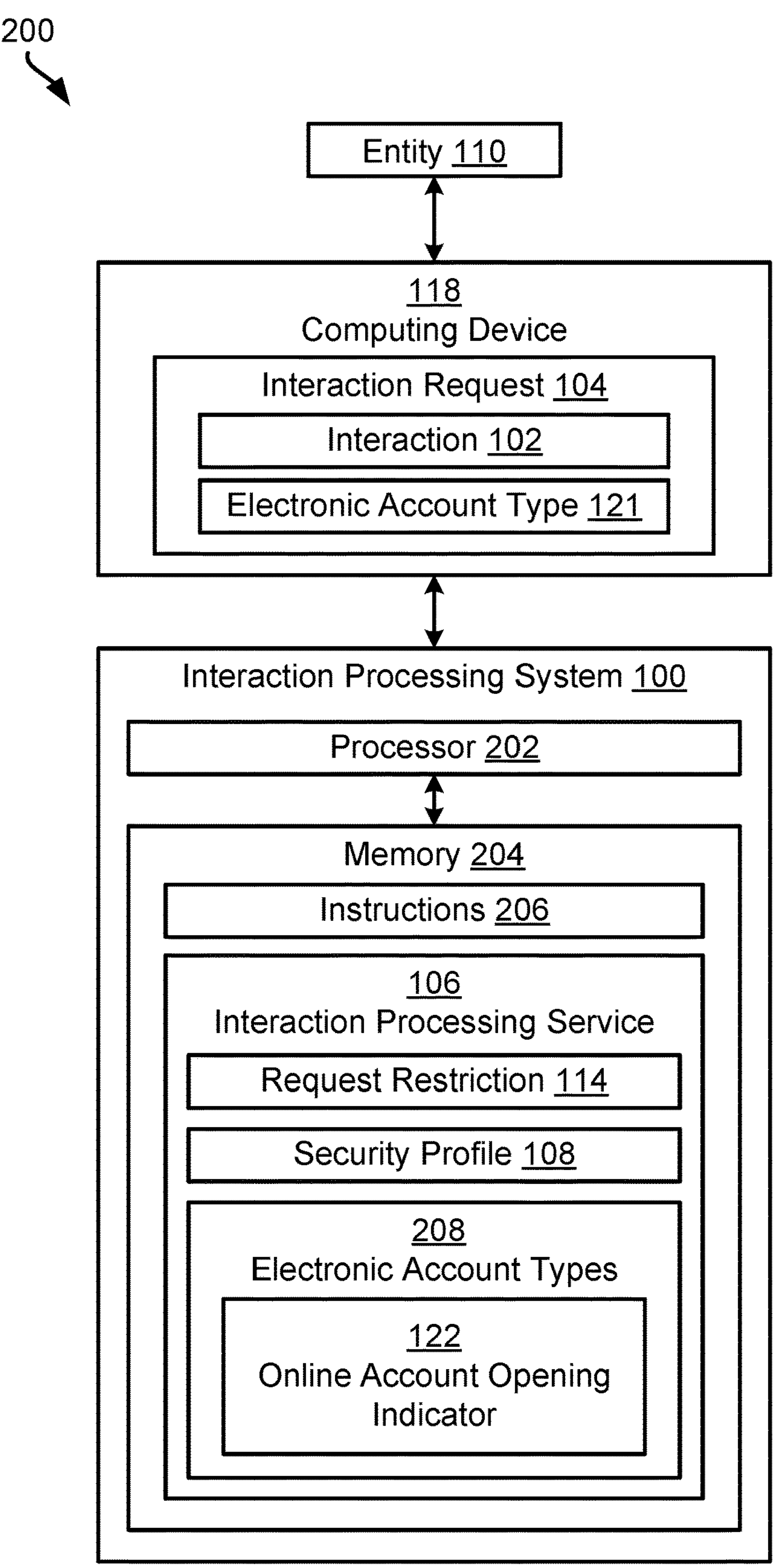
FIG. 2 is a block diagram of an example of a computing device for controlling an interaction using online indicators according to one example of the present disclosure.

FIG. 2 is a block diagram of an example of a computing device 200 for controlling an interaction 102 using online indicators to authenticate an interaction request 104 associated with the interaction 102 according to one example of the present disclosure. The computing device 200 may be a network device and may include a processor 202, a memory 204, and other suitable components. In some examples, the components illustrated in FIG. 2 may be integrated into a single structure. For example, the components can be within a single housing. In other examples, the components illustrated in FIG. 2 can be distributed, for example in separate housings and in electrical communication with each other.

The processor 202 may execute one or more operations for implementing various examples and embodiments described herein. The processor 202 can execute instructions stored in the memory 204 to perform the operations. The processor 202 can include one processing device or multiple processing devices. Non-limiting examples of the processor 202 include a Field-Programmable Gate Array ("FPGA"), an application-specific integrated circuit ("ASIC"), a microprocessor, etc.

The processor 202 may be communicatively coupled with the memory 204 via a bus. The non-volatile memory 204 may include any type of memory device that can retain stored information when powered off. Non-limiting examples of the memory 204 include electrically erasable and programmable read-only memory ("EEPROM"), flash memory, or any other type of non-volatile memory. In some examples, at least some of the memory 204 may include a medium from which the processor 202 can read instructions. A non-transitory computer-readable medium may include electronic, optical, magnetic, or other storage devices capable of providing the processor 202 with computer-readable instructions or other program code executable to perform operations. Non-limiting examples of a computer-readable medium include magnetic disk(s), memory chip(s), ROM, random-access memory ("RAM"), an ASIC, a configured processor, optical storage, or any other medium from which a computer processor may read instructions. The instructions 206 may include processor-specific instructions generated by a compiler or an interpreter from code written in any suitable computer-programming language, including, for example, C, C++, C#, Java, Perl, Python, etc.

For example, once the computing device 200, or any component thereof, receives the interaction request 104 initiated by an entity 110, the processor 202 may execute an interaction processing service 106 to verify the interaction request 104. In some examples, the processor 202 can identify the request restriction 114 associated with a security profile 108 of the entity 110. The processor 202 can use the request restriction 114 to determine an authorized online account opening indicator 122 of a set of electronic account types 208 indicated as authorized by the entity 110. In some examples, the processor 202 may generate the request restriction 114 using preferences indicated by the entity 110 such as by using an entity device 123 associated with the entity 110. The request restriction 114 can be associated with one or more online or electronic account indicators that can correspond to the authorized online account opening indicator 122 with respect to the interaction request 104. For example, the request restriction 114 may challenge or deny the interaction 102 of the interaction request 104 due to the interaction request 104 being inconsistent with the authorized online account opening indicator 122 indicated by the request restriction 114.

Based on the request restriction 114, the processor 202 can determine whether the interaction request 104 is authorized or unauthorized. If the electronic account type 121 is determined to not be consistent with the authorized online account opening indicator 122, the processor 202 may challenge the interaction 102 associated with the interaction request 104. The electronic account type 121 can be compared to the authorized online account opening indicator 122 such that the interaction request 104 can be rendered unauthorized if the electronic account type 121, or a technique used to request generation of the electronic account type 121, is inconsistent with the authorized online account opening indicator 122. In some examples, if the electronic account type 121 is determined to be consistent with the authorized online account opening indicator 122, the processor 202 can initiate the interaction 102 associated with the interaction request 104.

FIG. 3 is a flowchart of a process 300 for controlling an interaction 102 using online indicators to authenticate an interaction request 104 associated with the interaction 102 according to one example of the present disclosure. In some examples, the processor 202 can perform one or more of the steps shown in FIG. 3. In other examples, the processor 202 can implement more steps, fewer steps, different steps, or a different order of the steps depicted in FIG. 3. The steps of FIG. 3 are described below with reference to components discussed above in FIGS. 1-2.

At block 302, the processor 202 receives an interaction request 104 associated with an electronic account type 121. The interaction request 104 can be initiated by a computing device 118, such as through input provided by an entity 110 associated in response to prompts outputted by the computing device 118. For example, if the computing device 118 is a laptop or a mobile device, the computing device 118 can be used by the entity 110 to provide keystrokes or touch-screen input to initiate the interaction request 104, for example via a network connection or communication. In implementations of banking or financial services systems, the computing device 118 can be used to initiate an interaction request 104 to transfer funds, fulfill a service request, such as changing a card PIN, or generate a new banking account, etc. In such examples, the computing device 118 may be configured to connect to a webpage provided by an online services provider that can facilitate electronic account openings as the interaction request 104. The computing device can communicate with, such as transmit the interaction request 104, the webpage via the Internet or other suitable network.

At block 304, in response to receiving the interaction request 104, the processor 202 identifies a request restriction 114 associated with a security profile 108 of the entity 110 by executing an interaction processing service 106. The request restriction 114 can be used to identify an authorized online account opening indicator 122 of a set of electronic account types 208. The authorized online account opening indicator 122 can include one or more types of electronic accounts allowed to be opened via a network communication, one or more authentication techniques allowed to be used to open corresponding types of electronic accounts, or the like. For example, the processor 202 may use the request restriction to determine that an interaction request 104 associated with a first type of electronic account may be authorized. In another example, the processor 202 can use the request restriction to determine whether the interaction request 104 associated with the electronic account type 121 and associated with a first authentication technique may be authorized.

Executing the interaction processing service 106 can involve using the interaction processing service 106 to access and search the security profile 108 of the entity 110 for the request restriction 114. In some examples, the request restriction 114 may be tagged, for example using metadata, to enable the interaction processing service 106 to search the security profile 108 for the request restriction 114 relatively efficiently. For example, the processor 202 may identify the request restriction 114 after using the interaction processing service 106 and an entity identifier 112 associated with the entity 110 to determine the security profile 108 of the entity 110.

The request restriction 114 can be set by the entity device 123, for example using input received from the entity 110 via an application installed on the entity device 123. In such examples, the entity device 123 may display a user interface 128 that the entity 110 can interact with to indicate the request restriction 114, for example using a graphical control element of the user interface 128. Examples of interacting with the graphical control element can include toggling a switch, selecting one or more check boxes, selecting a radio button, providing text input in a text box or a combo box, adjusting a slider, making a selection from a dropdown menu, or other suitable interaction with the user interface 128. In some examples, the user interface 128 may provide other options to control the interaction 102 in addition to using the online account opening indicators associated with the electronic account type 121 of interaction request 104. For example, the other options to control the interaction 102 can include communication-based indicators corresponding to a communication channel, such as interactive voice response (IVR), location-based indicators, etc.

At block 306, the processor 202 challenges the interaction 102 associated with the interaction request 104 in response to determining that the interaction request 104 is unauthorized. In some examples, the processor 202 may challenge the interaction 102 in response to determining that the electronic account type 121 of the interaction request 104 is not consistent with the authorized online account opening indicator 122 based on the request restriction 114. Challenging the interaction 102 may decrease a likelihood of initiating a fraudulent interaction by requesting authentication 130 from the entity 110. In some examples, in response to challenging the interaction 102, the processor 202 may transmit a rejection notification 124 to the entity 110 to request the authentication 130 from the entity 110 to verify an identity 132 of the entity 110. Examples of the authentication 130 can include single-factor or multifactor authentication. The authentication 130 can be provided by the entity 110 using the entity device 123, for example using an authenticator application or other suitable authentication software installed on the entity device 123. If the processor 202 verifies the identity 132 of the entity 110 using the authentication provided by the entity 110, the processor 202 may proceed to block 308 to initiate the interaction 102.

In some examples, if the processor 202 is unable to verify the identity 132 of the entity 110 after receiving the authentication 130, the processor 202 may transmit a warning notification 134 to the entity 110. The warning notification 134 can be used to alert the entity 110 regarding the interaction request 104 that may be unauthorized, for example causing the entity 110 to realize that the request restriction 114 is mistakenly enabled. In such examples, the request restriction 114 then can be adjusted, such as disabled, toggled off, or updated, etc., by the entity 110 to enable the interaction 102 to be initiated. For example, a user interface 128 can be output by the entity device 123 that may allow the entity 110 to adjust the request restriction 114. Once the processor 202 detects an adjustment 126 to the request restriction 114, the processor 202 can return to block 304 to identify the adjusted request restriction 114 using the interaction processing service 106. If the adjusted request restriction 114 indicates that the interaction request 104 may be authorized, the processor 202 may proceed to block 308 to initiate the interaction 102. Otherwise, the processor 202 may proceed to block 306 to challenge the interaction 102 or may otherwise deny the interaction request 104.

At block 308, in response to determining that the electronic account type 121 of the interaction request 104 is consistent with the authorized online account opening indicator 122 based on the request restriction 114, the processor 202 initiates the interaction 102 associated with the interaction request 104. For example, if the electronic account type 121 of the request restriction 114 is included in one or more account types of the authorized online account opening indicator 122, the processor 202 can authorize the interaction request 104 and initiate the interaction 102. In some examples, if the electronic account type 121, or an authentication technique associated with the interaction request 104, is inconsistent with the online account opening indicator 122, but the online account opening indicator 122 is disabled, the processor 202 may similarly authorize the interaction request 104 and initiate the interaction 102.

In a particular example, the processor 202 may receive a request, from the computing device 118, to generate an electronic account include a financial loan associated with the entity 110 as the interaction request 104. Once the computing device 200, or any component thereof, receives the interaction request 104, the processor 202 can access the security profile 108 associated with the entity 110 to identify a request restriction 114 corresponding to the interaction request 104. In some examples, the request restriction 114 may render the request to generate the electronic account unauthorized due to the financial loan of the interaction request 104 being inconsistent with the authorized online account opening indicator 122. The processor 202 then may challenge the interaction request 104 such that the processor 202 may deny opening the electronic account type 121 or may request additional verification from the entity 110 prior to opening the electronic account type 121. If the request restriction 114 indicates that the interaction request 104 is authorized, the processor 202 can initiate the interaction request 104 such that the electronic account type 121 including the financial loan can be generated.

Although the subject matter has been described in language specific to structural features or methodological acts, it is to be understood that the subject matter defined in the appended claims is not necessarily limited to the specific features or acts described above. Rather, the specific features and acts described above are disclosed only for the purpose of illustration and description and they are not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

The invention claimed is:

1. A system comprising:

a processor; and a memory including instructions that are executable by the processor for causing the processor to perform operations comprising:

receiving (i) an interaction request involving an electronic account type associated with an entity and (ii) a technique for requesting generation of the electronic account type, the interaction request being initiated over a network using a computing device;

in response to receiving the interaction request, identifying a request restriction associated with a security profile of the entity by executing an interaction processing service, the request restriction usable to identify a plurality of online account opening indicators that comprises a first indicator of a particular electronic account type and a second indicator of a particular technique used to request generation of the electronic account type;

in response to determining that (i) the electronic account type of the interaction request is not consistent with the particular electronic account type or (ii) the technique for requesting generation of the electronic account type is not consistent with the particular technique used to request generation of the electronic account type based on the request restriction, challenging an interaction associated with the interaction request;

outputting a first command executable to provide a multi-factor authentication challenge in response to the interaction request;

in response to determining that (i) the electronic account type of the interaction request is consistent with the particular electronic account type and (ii) the technique for requesting generation of the electronic account type is consistent with the particular technique used to request generation of the electronic account type based on the request restriction, initiating the interaction associated with the interaction request; and outputting a second command executable to generate an account of the electronic account type associated with interaction request and the entity.

2. The system of claim 1, wherein the operations further comprise, in response to challenging the interaction associated with the interaction request:

transmitting a rejection notification to an entity device associated with the entity, wherein the rejection notification is configured to request an authentication from the computing device that is usable to verify an identity of a user of the computing device;

verifying the identity of the user based on the authentication received from the entity; and in response to verifying the identity of the entity, initiating the interaction associated with the interaction request.

3. The system of claim 1, wherein the operations further comprise, subsequent to determining that the electronic account type of the interaction request is not consistent with the plurality of authorized online account opening indicators:

executing an artificial intelligence (AI) module configured to identify fraudulent activity by analyzing activity data from the interaction processing service using one or more machine-learning models; and in response to identifying the fraudulent activity, transmitting a warning notification to alert the entity regarding the fraudulent activity associated with the interaction request.

4. The system of claim 1, wherein the operations further comprise, in response to challenging the interaction associated with the interaction request:

transmitting a warning notification to the entity using a verified contact preference, wherein the warning notification is configured to alert the entity regarding the electronic account type of the interaction request being inconsistent with the plurality of authorized online account opening indicators.

5. The system of claim 1, wherein the electronic account type includes a financial loan, an online security account, or a financial institution deposit account.

6. The system of claim 1, wherein the request restriction is adjustable by the entity using an entity device associated with the entity prior to and subsequent to initiating the interaction request, and wherein the operations further comprise, subsequent to identifying the request restriction associated with the security profile of the entity:

determining that the electronic account type of the interaction request renders the interaction request unauthorized based on the plurality of authorized online account opening indicators of the request restriction;

detecting an adjustment to the request restriction, wherein the adjustment is indicatable by the entity using a user interface of the entity device to access the security profile of the entity; and in response to detecting the adjustment, determining that the electronic account type of the interaction request renders the interaction request authorized based on the adjustment to the request restriction.

7. The system of claim 1, wherein the operation of executing the interaction processing service comprises:

determining the security profile of the entity using an entity identifier associated with the entity, wherein the security profile includes the request restriction associated with controlling the interaction based on the electronic account type of the interaction; and identifying the authorized online account opening indicator based on the request restriction; and determining whether the authorized plurality of online account opening indicators of the request restriction is consistent with the electronic account type of the interaction request.

8. The system of claim 1, wherein:

the operation of receiving (i) the interaction request involving an electronic account type associated with an entity and (ii) the technique for requesting generation of the electronic account type comprises:

receiving metadata with the interaction request, identifying the electronic account type associated with the entity using a first subset of the metadata, and identifying the technique for requesting the generation of the electronic account type using a second subset of the metadata that is different from the first subset of the metadata, the second subset of the metadata including a geographic location tag indicating a location from which the interaction request originated; and the operation of identifying the request restriction associated with the security profile of the entity by executing an interaction processing service comprises:

ascertaining, using at least a portion of the metadata of the interaction request, that the security profile is associated with the entity, generating a query configured to cause the security profile to provide a set of request restrictions based on the entity, receiving the set of request restrictions from the security profile in response to transmitting the query to the security profile, and extracting the request restriction from the set of request restrictions by determining that the request restriction is applicable to the interaction request and that other request restrictions included in the set of request restrictions are not applicable to the interaction request; and the request restriction is a machine-learning model that is configured to generate a prediction indicating a likelihood of the interaction request being legitimate; and the request restriction comprises a decision tree model that is configured to generate the prediction.

9. The system of claim 1, wherein the request restriction indicates a set of authorized electronic account types and a set of authorized techniques, and wherein the operations further comprise:

determining that the particular technique used to request generation of the electronic account type based on the request restriction is not included in the set of authorized techniques;

in response to determining that the particular technique used to request generation of the electronic account type based on the request restriction is not included in the set of authorized techniques and challenging the interaction associated with the interaction request, generating a warning notification that is configured to indicate that the interaction is challenged because the particular technique is not included in the set of authorized techniques;

transmitting the warning notification to an entity device associated with the entity, the warning notification including data that causes the entity device to display a user interface with a set of interactive fields to receive input from the entity, the set of interactive fields including a first field to request that the interaction be denied and a second field to request an adjustment to the request restriction;

receiving, via the second field of the set of interactive fields, input indicating a request by the entity for the adjustment to the request restriction associated with the security profile, the adjustment including a change to the request restriction that updates the set of authorized techniques to include the particular technique;

transmitting instructions to the entity device that cause the entity device to provide a multi-factor authentication challenge in response to receiving the input indicating the request for the adjustment;

authenticating the adjustment in response to receiving a successful output from the multi-factor authentication challenge from the entity device;

in response to authenticating the adjustment, updating the request restriction to create an updated request restriction that reflects the adjustment by augmenting the set of authorized techniques with the particular technique; and determining, based on the updated request restriction, to initiate the interaction associated with the interaction request.

10. A method comprising:

receiving, by a computing device, (i) an interaction request involving an electronic account type associated with an entity and (ii) a technique for requesting generation of the electronic account type, the interaction request being initiated over a network using a computing device;

in response to receiving the interaction request, identifying, by the computing device, a request restriction associated with a security profile of the entity by executing an interaction processing service, the request restriction usable to identify a plurality of online account opening indicators that comprises a first indicator of a particular electronic account type and a second indicator of a particular technique used to request generation of the electronic account type;

in response to determining that (i) the electronic account type of the interaction request is not consistent with the particular electronic account type or (ii) the technique for requesting generation of the electronic account type is not consistent with the particular technique used to request generation of the electronic account type based on the request restriction, challenging, by the computing device, an interaction associated with the interaction request;

outputting, by the computing device, a first command to provide a multi-factor authentication challenge in response to the interaction request;

in response to determining that (i) the electronic account type of the interaction request is consistent with the particular electronic account type and (ii) the technique for requesting generation of the electronic account type is consistent with the particular technique used to request generation of the electronic account type based on the request restriction, initiating, by the computing device, the interaction associated with the interaction request; and outputting, by the computing device, a second command to generate an account of the electronic account type associated with interaction request and the entity.

11. The method of claim 10, further comprising, in response to challenging the interaction associated with the interaction request:

transmitting, by the computing device, a rejection notification to an entity device associated with the entity, wherein the rejection notification is configured to request an authentication from the computing device that is usable to verify an identity of a user of the computing device;

verifying the identity of the user based on the authentication received from the entity; and in response to verifying the identity of the entity, initiating the interaction associated with the interaction request.

12. The method of claim 10, further comprising, subsequent to determining that the electronic account type of the interaction request is not consistent with the plurality of authorized online account opening indicators:

executing, by the computing device, an artificial intelligence (AI) module configured to identify fraudulent activity by analyzing activity data from the interaction processing service using one or more machine-learning models; and in response to identifying the fraudulent activity, transmitting, by the computing device, a warning notification to alert the entity regarding the fraudulent activity associated with the interaction request.

13. The method of claim 10, further comprising, in response to challenging the interaction associated with the interaction request:

transmitting, by the computing device, a warning notification to the entity using a verified contact preference, wherein the warning notification alerts the entity regarding the electronic account type of the interaction request being inconsistent with the plurality of authorized online account opening indicators.

14. The method of claim 10, wherein the request restriction is adjusted by the entity using an entity device associated with the entity prior to and subsequent to initiating the interaction request, and wherein the method further comprises, subsequent to identifying the request restriction associated with the security profile of the entity:

determining, by the computing device, that the electronic account type of the interaction request renders the interaction request unauthorized based on the plurality of online account opening indicators;

detecting, by the computing device, an adjustment to the request restriction, wherein the adjustment is indicated by the entity using a user interface of the entity device to access the security profile of the entity; and in response to detecting the adjustment, determining, by the computing device, that the electronic account type of the interaction request renders the interaction request authorized based on the adjustment to the request restriction.

15. The method of claim 10, wherein executing the interaction processing service comprises:

determining the security profile of the entity using an entity identifier associated with the entity, wherein the security profile includes the request restriction associated with controlling the interaction based on the electronic account type of the interaction; and identifying the authorized online account opening indicator based on the request restriction; and determining whether the authorized plurality of online account opening indicators of the request restriction is consistent with the electronic account type of the interaction request.

16. A non-transitory computer-readable medium comprising program code executable by a processing device for causing the processing device to perform operations comprising:

receiving (i) an interaction request involving an electronic account type associated with an entity and (ii) a technique for requesting generation of the electronic account type, the interaction request being initiated over a network using a computing device;

in response to receiving the interaction request, identifying a request restriction associated with a security profile of the entity by executing an interaction processing service, the request restriction usable to identify a plurality of online account opening indicators that comprises a first indicator of a particular electronic account type and a second indicator of a particular technique used to request generation of the electronic account type;

in response to determining that (i) the electronic account type of the interaction request is not consistent with the particular electronic account type or (ii) the technique for requesting generation of the electronic account type is not consistent with the particular technique used to request generation of the electronic account type based on the request restriction, challenging an interaction associated with the interaction request;

outputting a first command executable to provide a multi-factor authentication challenge in response to the interaction request;

in response to determining that (i) the electronic account type of the interaction request is consistent with the particular electronic account type and (ii) the technique for requesting generation of the electronic account type is consistent with the particular technique used to request generation of the electronic account type based on the request restriction, initiating the interaction associated with the interaction request; and outputting a second command executable to generate an account of the electronic account type associated with interaction request and the entity.

17. The non-transitory computer-readable medium of claim 16, wherein the operations further comprise, in response to challenging the interaction associated with the interaction request:

transmitting a rejection notification to an entity device associated with the entity, wherein the rejection notification is configured to request an authentication from the computing device that is usable to verify an identity of a user of the computing device;

verifying the identity of the user based on the authentication received from the entity; and in response to verifying the identity of the entity, initiating the interaction associated with the interaction request.

18. The non-transitory computer-readable medium of claim 16, wherein the operations further comprise, subsequent to determining that the electronic account type of the interaction request is not consistent with the plurality of authorized online account opening indicators:

executing an artificial intelligence (AI) module configured to identify fraudulent activity by analyzing activity data from the interaction processing service using one or more machine-learning models; and in response to identifying the fraudulent activity, transmitting a warning notification to alert the entity regarding the fraudulent activity associated with the interaction request.

19. The non-transitory computer-readable medium of claim 16, wherein the operations further comprise, in response to challenging the interaction associated with the interaction request:

transmitting a warning notification to the entity using a verified contact preference, wherein the warning notification is configured to alert the entity regarding the electronic account type of the interaction request being inconsistent with the plurality of authorized online account opening indicators.

20. The non-transitory computer-readable medium of claim 16, wherein the request restriction is adjustable by the entity using an entity device associated with the entity prior to and subsequent to initiating the interaction request, and wherein the operations further comprise, subsequent to identifying the request restriction associated with the security profile of the entity:

determining that the electronic account type of the interaction request renders the interaction request unauthorized based on the plurality of authorized online account opening indicators of the request restriction;

detecting an adjustment to the request restriction, wherein the adjustment is indicatable by the entity using a user interface of the entity device to access the security profile of the entity; and in response to detecting the adjustment, determining that the electronic account type of the interaction request renders the interaction request authorized based on the adjustment to the request restriction.

* * * * *